United States Patent
Gorohata et al.

(10) Patent No.: US 7,086,136 B2
(45) Date of Patent: Aug. 8, 2006

(54) METHOD OF MANUFACTURING A SEQUENTIAL SEGMENT JOINING TYPE STATOR COIL

(75) Inventors: Tetsuya Gorohata, Anjo (JP); Youichi Kamakura, Anjo (JP); Hitoshi Hirano, Anjo (JP)

(73) Assignee: Denso Corporation, Kariya (JP)

( * ) Notice: Subject to any disclaimer, the term of this patent is extended or adjusted under 35 U.S.C. 154(b) by 378 days.

(21) Appl. No.: 10/452,645

(22) Filed: Jun. 3, 2003

(65) Prior Publication Data

US 2003/0233747 A1    Dec. 25, 2003

(30) Foreign Application Priority Data

Jun. 25, 2002   (JP)   ............... 2002-185231

(51) Int. Cl.
*H02K 15/00*  (2006.01)
*H02K 15/14*  (2006.01)
*H02K 15/16*  (2006.01)

(52) U.S. Cl. .................... 29/596; 29/598; 29/605; 29/732; 29/840; 219/75; 219/125.11; 310/184

(58) Field of Classification Search .............. 29/596, 29/732, 840, 598, 605; 310/184; 219/75, 219/125.11
See application file for complete search history.

(56) References Cited

U.S. PATENT DOCUMENTS

| | | |
|---|---|---|
| 6,177,747 B1 | 1/2001 | Maeda et al. |
| 6,249,956 B1 | 6/2001 | Maeda et al. |
| 6,403,921 B1 | 6/2002 | Maeda et al. |
| 2001/0011852 A1 | 8/2001 | Nakamura et al. |
| 2002/0041129 A1 | 4/2002 | Oohashi et al. |
| 2003/0137207 A1* | 7/2003 | Tamura et al. ............ 310/184 |

FOREIGN PATENT DOCUMENTS

| | | |
|---|---|---|
| EP | 1 041 696 A1 | 10/2000 |
| EP | 1 128 530 A2 | 8/2001 |
| EP | 1 187 299 A2 | 3/2002 |
| JP | A 2000-139049 | 5/2000 |
| JP | B1 3104700 | 9/2000 |
| JP | B2 3118837 | 10/2000 |
| JP | B2 3196738 | 6/2001 |

* cited by examiner

*Primary Examiner*—A. Dexter Tugbang
*Assistant Examiner*—Tim Phan
(74) *Attorney, Agent, or Firm*—Oliff & Berridge, PLC

(57) ABSTRACT

Provided is a method of manufacturing a sequential segment joining type stator coil for use in an electric rotating machine, capable of achieving satisfactory electrical and thermal contact between end tip portion pairs of segments and basal electrodes and of realizing suitable welding even in the alignment of a large number of end tip portion pairs. For the arc welding of the end tip portion pairs of a sequential segment joining type stator coil, a large number of end tip portion pairs adjoining each other in a radial direction are held and pressed between basal electrode blocks. At this time, a circular-arc-like auxiliary electrode is put in a radial spacing between the end tip portion pairs. This not only enables the feeding to the end tip portion pairs lying at an intermediate position in the radial direction but also stabilizes the positions of the end tip portion pairs, and even reduces the heat radiation to an insulating coat of end skewing portions extending from the proximal portions of each end tip portion pair.

5 Claims, 13 Drawing Sheets

METHOD OF MANUFACTURING A SEQUENTIAL SEGMENT JOINING TYPE STATOR COIL

CROSS REFERENCE TO RELATED DOCUMENT

This application claims priority to Japanese Patent Application No. 2002-185231, filed on Jun. 25, 2002.

BACKGROUND OF THE INVENTION

1) Field of the Invention

The present invention relates to a sequential segment joining type stator coil of an electric rotating machine (rotary electric machine) and a manufacturing method therefor.

2) Description of the Related Art

So far, there has been proposed a sequential segment joining type stator coil produced by sequentially joining many segment conductors inserted into slots of a stator core. For example, Japanese Patent No. 3118837 discloses a production of a sequential segment joining type stator coil in which joined sequentially are segments each forming a generally U-shaped electric conductor piece.

Further explaining it, for the production of this sequential segment joining type stator coil, a pair of leg portions of each of segments are individually inserted into a pair of slots separated from each other by approximately a magnetic pole pitch of a rotor and both the end portions thereof protruding therefrom are bent in circumferential directions, and the tips of both the leg sections of the respective segments are sequentially joined together.

That is, each of the segments is composed of a generally U-shaped (more accurately, a generally V-shaped) head portion (equally referred to as a "bent portion" or "turn portion"), a pair of slot electric conductors formed on both ends of the head portion and individually inserted into two different slots of a stator core from one side of the stator core in its axial direction, and a pair of protruding end portions formed on the tips of both the slot electric conductors to protrude toward the other side of the stator core in the axial direction and extend in its circumferential direction. The tips of the protruding end portions are joined by pairs. In the specification of the foregoing document, the slot electric conductors and the protruding end portions are equally referred to collectively as segment leg portions. Therefore, the head portion of each of the segments constitutes a head side coil end of a stator coil while the protruding end portions of each of the segments organize an end side coil end of the stator coil.

In addition, Japanese Patent No. 3118837 discloses that a total of four leg portions of a segment set comprising a small segment and a large segment surrounding this small segment are individually held in two rings located coaxially and these rings are relatively rotated to turn a pair of leg portions of each segment in a circumferential direction for the formation of head skewing portions.

Still additionally, Japanese Patent Laid-Open No. 2000-139049 discloses that a total of four leg portions of a segment set comprising a small segment and a large segment surrounding this small segment, each accommodated in a slot of a stator core, are individually held in four rings located coaxially and these rings are relatively rotated to turn a pair of leg portions of each segment in a circumferential direction for the formation of end skewing portions.

Yet additionally, Japanese Patent No. 3104700 discloses that, for a pair of end tip portions extending from four in-slot conductor portions adjacent to each other in a radial direction of a segment set and adjacent to each other in a radial direction thereof, basal electrode blocks are brought radially and outwardly into surface contact with radial-outside surfaces of the radial-outside end tip portion pair to bias this pair radially and inwardly, and radial-inside basal electrode blocks are brought into surface contact with radial-inside surfaces of the radial-inside end tip portion pair to bias this pair radially and outwardly, while a square-bar-like radial basal electrode extending radially is put in a circumferential spacing between the end tip portion pair adjacent to each other in a circumferential direction and a welding tip electrode is disposed close to axial tip surfaces of the end tip portion pair to be welded to weld the end tip portion pair.

A description will be given hereinbelow of an example of a manufacturing method for a sequential segment joining type stator coil disclosed in the above-mentioned documents and others.

First, the necessary number of pine-needle-like segments are prepared. Then, the pine-needle-like segments are processed into U-shaped segments and a pair of in-slot conductor portions of each segment are separated by approximately pole pitch from each other in a circumferential direction and a step is conducted so that the necessary number of segments are spatially disposed (arranged in a circumferential direction) to be simultaneously inserted into a slot of a core. In this step, for example, the rings with a plurality of holes disposed coaxially, shown in FIG. 3 of the above-mentioned Japanese Patent No. 3118837, are used and both leg portions of each of the pine-needle-like segments are individually inserted into the holes made in the corresponding circumferential positions of these hole-made rings and the rings are relatively rotated by an approximately pole pitch so that the pine-needle segment is processed into a U-shaped segment in which its head portion is spread circumferentially into a U-like (or V-like) configuration. Usually, this step is implemented with respect to a segment set comprising a small segment and a large segment.

As a subsequent step, each of the segments formed into a U-like configuration and aligned in a circumferential direction is inserted into the slot of the core. In this step, a head portion of each of the segments deformed into a U-like configuration and aligned in a circumferential direction is held while leg portions thereof are drawn out from the aforesaid pair of hole-made rings and are inserted into the slot of the core.

Following this, a step follows to bend protruding end portions protruding from the slot in a circumferential direction. Preferably, each of the protruding end portions is bent by the half of the pole pitch in the circumferential direction. Such circumferential bending can be made such that, for example, through the use of rings each having a plurality of holes and disposed coaxially, shown in FIGS. 4 and 5 of the above-mentioned Japanese Patent No. 3196738, the tips of the protruding end portions are inserted into the respective holes of the hole-made rings and each of the hole-made rings is rotated by the half of the pole pitch (electrical angle $\pi/2$) in a circumferential direction to bend each of the protruding end portions by the half of the pole pitch in the circumferential direction. In this connection, it is preferable that, in rotating each of the hole-made rings, the hole-made ring is directed at the protruding end portion and is rotated while being biased in an axial direction, for that this can enlarge the radius of curvature of the bending point. Then, a welding step follows to weld the tips of the respective protruding end portions in a predetermined sequence.

Thus, phase coils signifying coils of the respective phases are formed in an endless condition and a U-shaped head portion of each U-shaped segment is cut at an appropriate site, thereby forming outgoing terminals of each phase coil. If these outgoing terminals are made long in advance, when each of these long-made portions is bent in a circumferential direction, it can be used as a crossover for a neutral point. Incidentally, the reason that these outgoing terminals are located at the head side coil ends is that, in the case of the location at the end side coil ends, the long outgoing terminals interfere with the welding step.

The sequential segment joining type stator coil described above has so far been employed as a stator coil of an AC generator for vehicles.

However, the sequential segment joining type stator coil disclosed in the above-mentioned documents and others creates the following problems.

As mentioned above, Japanese Patent No. 3104700 proposes a welding technique in which, as shown in FIG. 14, a radial-outside basal electrode block 11x contact-feeds electricity to a radial-outside end tip portion pair 13x of a segment set while a radial-inside basal electrode block 10x contact-feeds electricity to a radial-inside end tip portion pair 13x of the segment set, and even these end tip portion pairs 13x are interposed between a pair of square-bar-like radial basal electrodes 12x for feeding electricity.

However, in the case of this conventional end tip portion pair welding technique, there are problems to be solved as mentioned below.

First, in the above-described conventional technique, there is a need to strongly press the radial-outside basal electrode to the radial-outside end tip portion pair and the radial-inside basal electrode to the radial-inside end tip portion pair, and this strong biasing force can displace or deform the radial-outside end tip portion pair toward the inside in a radial direction and, likewise, displace or deform the radial-inside end tip portion pair to the outside in a radial direction, which can cause poor welding due to the positional displacement or can shorten the spacing between these end tip portion pairs in a radial direction after welding to degrade the electrical insulating property therebetween. In this connection, the end tip portion pair is one-end-supported through end skewing portions by the stator core and the displacement or deformation of the end tip portion pair can easily occur due to elastic deformation or plastic deformation of the end skewing portions with a slot end surface of the stator core functioning as a supporting point.

On the other hand, the reduction of the aforesaid biasing force can deteriorate the insulating coat of the end skewing portions in the vicinity of the end tip portion pair due to a rise of the temperature of the basal electrode or the proximal portions of the end tip portion pair. Moreover, it can create a variation of the contact resistance voltage drop between the basal electrode and the end tip portion pair, which leads to an easy variation of a current flowing therethrough to result in welding finishes in dispersed conditions.

In addition, an electric rotating machine small in size, such as a vehicle AC generator conventionally known as an alternator, accepts such a turn configuration that one segment set, mentioned above, is disposed in a radial direction (four in-slot conductor portions are radially inserted into a slot) and, hence, as shown in FIG. 14, large-size radial-outside and radial-inside basal electrode blocks 10x and 11x can be disposed in a flee space to excellently reduce the resistance heat generation in the basal electrode, and the basal electrode blocks 10x and 11x carry out heat absorption to reduce the heat of the end tip portion pair 13x to be transferred from the proximal portions of the end tip portion pair 13x to an end skewing portion 14x with an insulating coat, thereby preventing the deterioration of the insulating coat.

However, in the case of a high-voltage motor such as a motor for driving a motor vehicle, it is expected that a large number of segment sets mentioned above are disposed in radial directions to increase the number of turns, and in this case, since it is not easy that the energization of the end tip portion pairs at intermediate positions in radial directions is made with a low resistance, difficulty is experienced in realizing a sequential segment joining stator coil type electric rotating machine with many turns, thus making it difficult to realize a high-voltage motor such as a vehicle driving motor.

SUMMARY OF THE INVENTION

The present invention has been developed in consideration of the above-mentioned problems, and it is therefore an object of the invention to provide a method of manufacturing a sequentially segment joining type stator coil for an electric rotating machine capable of achieving satisfactory electrical/thermal contact between an end tip portion pair and a basal electrode and, in particular, capable of welding suitably even in a case in which a large number of end tip portion pairs are aligned or arranged in radial directions, and further to provide a high-voltage electric rotating machine produced appropriately through the use of the manufacturing method.

For this purpose, in accordance with a first aspect of the present invention, prepared are a large number of segments each having a generally U-shaped or generally V-shaped head portion, in-slot conductor portions extending from both ends of the head portion and individually accommodated in a pair of slots of a stator core and protruding end portions extending from both the in-slot conductor portions to protrude from an end surface of the stator core, and end tip portions forming tip portions of the protruding end portions and protruding in axial directions are placed by pairs adjacently to each other in a radial direction to produce end tip portion pairs and proximal portions of the plurality of end tip portion pairs are sandwiched and pressed between a pair of basal electrodes in radial directions in a state where a circular-arc-like interposition member is put between the plurality of end tip portion pairs placed adjacently in the radial direction, and a voltage is applied between a tip electrode facing tip surfaces of the end tip portion pair and the pair of basal electrodes or the interposition member to electrically weld the end tip portion pair together.

That is, in this segment welding method according to the present invention, the welding is made in a state where the interposition member is put between the end tip portion pairs adjacent to each other in a radial direction.

Thus, since the interposition member exists between the radial spacing between the plurality of end tip portion pairs, when the plurality of end tip portion pairs are sandwiched and pressed between the basal electrodes in radial directions, against the radial biasing of the end tip portion pairs by the basal electrodes, the radial displacement or deformation of the end tip portion pairs does not occur, thereby improving the face-to-face condition between a tip electrode for welding and tip surfaces of the end tip portion pairs to be welded.

Moreover, it is possible to enhance and uniformize the contact pressure between the basal electrodes and the end tip portion pairs while preventing the aforesaid displacement or deformation, which reduces and stabilizes the contact resistance between the basal electrodes and the end tip portion pairs, thus reducing a variation of a welding current and making the basal electrodes stably absorb the heat flowing from the melted tip portions of the end tip portion pairs to the end skewing portions with an insulating coat for suppressing the degradation of the insulating coat.

According to a second aspect of the present invention, in the manufacturing method mentioned above, the interposition member is made from a metallic material having an electrical conductive property to also function as a portion of the basal electrodes and removed after the completion of the welding. This enlarges the contact area between the basal electrodes and the end tip portion pairs to enhance the above-mentioned effects.

According to a third aspect of the present invention, in the manufacturing method mentioned above, since the interposition member is put between the large number of end tip portion pairs adjacent to each other in radial directions, the electricity can also be fed to radial-middle end tip portion pairs which do not come into contact with both the basal electrode blocks arranged in a radial direction. This allows a large number of segment sets to be aligned at a high density in radial directions, thus realizing a sequential segment joining type stator coil to be available at a high voltage, such as a vehicle driving motor requiring many turns.

According to a fourth aspect of the present invention, in the manufacturing method mentioned above, the interposition member is made of an insulating material having an electrical insulating property. Accordingly, there is no need to remove this interposition member after the completion of the welding and, hence, the facilitation of the operations becomes feasible.

According to a fifth aspect of the present invention, in the method of manufacturing a sequential segment joining type stator coil for use in an electric rotating machine according to the first aspect, the interposition member is composed of a pair of metallic members having an electrical conductive property and individually brought into contact with the end tip portion pair existing at both sides thereof in a radial direction and an insulating member interposed between the metallic members. Thus, after the completion of the welding, these metallic members are divided in a spacing between the end tip portion pair adjacent to each other in a circumferential direction, thereby securing an electrical insulation between the end tip portion pair. This eliminates the need for the removal of the interposition member after the welding.

Furthermore, in accordance with a sixth aspect of the present invention, there is provided a sequential segment joining type stator coil for use in an electric rotating machine manufactured according to a manufacturing method comprising the steps of preparing a large number of segments each having a generally U-shaped or generally V-shaped head portion, in-slot conductor portions extending from both ends of the head portion and individually accommodated in a pair of slots of a stator core and protruding end portions extending from both the in-slot conductor portions to protrude from an end surface of the stator core, placing end tip portions forming tip portions of the protruding end portions and protruding in axial directions by pairs in an radially adjoining condition to produce a plurality of end tip portion pairs, sandwiching and pressing proximal portions of the plurality of end tip portion pairs between a pair of basal electrodes in radial directions in a state where a circular-arc-like interposition member is put between the plurality of radially adjoining end tip portion pairs, and applying a voltage between a tip electrode facing tip surfaces of the end tip portion pair and the pair of basal electrodes or the interposition member to electrically weld the end tip portion pair together, wherein the large number of segments are classified into small segments and large segments to form a large number of segment sets, and the large number of segment sets each composed of the small segment having a small head portion connected to a pair of in-slot conductor portions individually accommodated in a pair of conductor accommodation positions adjacent to each other in a radial direction and the large segment having a large head portion disposed to radially surround the small head portion are arranged in radial directions, and aligned at radially equal positions in circumferential directions to constitute partial phase coils to which a predetermined phase voltage is applied, and a phase coil is made by connecting the partial phase coils in series in a manner such that the partial phase coils adjacent in radial directions are sequentially connected to each other.

Although an AC generator for a motor vehicle has so far been considered as an application of an electric rotating machine using a sequential segment joining type stator coil, it is also expected to employ it as a large-output vehicle driving motor. The driving motor requires the supply of a battery voltage (several hundreds V) extremely higher than before for the reduction of the resistance loss in the wiring and the stator coil. However, since both the machines are nearly equal in speed of rotation to each other, the sequential segment joining type stator coil for the driving motor requires an extremely larger number of turns as compared with the sequential segment joining type stator coil for the vehicle AC generator.

For increasing the number of turns, as shown in FIG. 15, it is considered that segments 33(*a* to *e*) are disposed in a mutually multi-surrounding fashion (in FIG. 15, five-story disposition) to increase the number of radial conductors within a slot S. However, the segment configuration according to this mutually multi-surrounding fashion creates problems in that there is a need for segment types corresponding to the number of times of surrounding and the wiring resistance increases because of a long wiring distance with respect to a head portion of the outside segment 33*e*.

In particular, since the radial width of the head tip portion H of the U-shaped segment becomes larger than the radial width of the pair of lag portions L for manufacturing reasons, although omitted from FIG. 15, in fact there arises problems in that the radial width W of the head side coil end 311 becomes considerably larger in FIG. 4 and the axial length of the head side coil end 311 also increases to lengthen the length of the motor shaft and increase its body-build weight.

In addition, since the radial width of the head portion of the segment becomes larger than the radial width of the lug portion pair thereof as mentioned above, problems arise in that there is a need to secure a spacing d between the led portions H and H of the different segments adjacent to each other in a radial direction for the purpose of preventing the rubbing therebetween at the spreading and, hence, the slot space factor drops accordingly.

Still additionally, a problem arises in that the aforesaid multi-surround degrades the head radiation of the inside segment 33*a*.

For coping with such problems, in this configuration, as shown in FIG. 3, segment sets each occupying four radially consecutive conductor accommodation positions in a slot are piled up in a radial direction and predetermined segment sets aligned in a circumferential direction are connected in series to each other to produce a partial phase coil, and the respective partial phase coils composed of the segment sets at different radial positions and adjacent to each other are sequentially connected in a radial direction to constitute a phase coil.

With this configuration, the connections between the partial phase coils adjacent to each other in a radial direction are easily feasible through the use of different U-shaped segments, and a current distribution does not concentrate locally due to the scattering in temperature wiring length between the different segment sets (partial phase coils) in a radial direction to avoid the local generation of excessive heat, thus facilitating increasing the number of turns.

According to a seventh aspect of the present invention, in the configuration according to the sixth aspect of the invention, included are an in-phase slot group composed of the large number of slots including the pair of slots accommodating the in-slot conductor portions, to which the same phase voltage is applied, and consecutively adjoining in a circumferential direction and a large number of serial phase coil circuits made by sequentially making serial connections between the radially adjoining coils of the large number of partial phase coils accommodated in the slots to take radially different positions so that they are accommodated in different slots of the in-phase slot group, with the phase coil being constructed by further connecting the large number of serial phase coil circuits in parallel.

Although an AC generator for a motor vehicle has so far been considered as an application of an electric rotating machine using a sequential segment joining type stator coil, it is also expected to employ it as a large-output vehicle driving motor. Such a large output requires a large current and, since limitation is imposed on the enlargement of the segment cross section for obtaining the large current, although there is a need to connect the partial phase coils in parallel for increasing the total of cross-sectional area of the phase coil, such parallel connections require additional use of crossover or the like and, hence, a difficulty arises in the formation using the sequential segment connections.

For this reason, in this configuration, the phase coil in the sixth aspect is constructed as a serial phase coil circuit and a plurality of serial coil circuits are used so that the plurality of serial phase coils are accommodated in different slots of the in-phase slot group. This configuration can eliminate the differences in wiring resistance among the respective serial phase coil circuits and can satisfactorily reduce the current differences among the partial phase coils. In particular, the important advantage is that, even if the resistance differences appear among the partial phase coils existing at different positions in a radial direction, the resistance differences do not occur among the respective serial phase coil circuits.

Therefore, with this configuration, it is possible to realize an increase in the number of turns of the coil without using many types of segments or additionally using complicated and special crossover at coil ends, thus realizing a stator coil of a vehicle driving motor requiring a high voltage.

BRIEF DESCRIPTION OF THE DRAWINGS

Other objects and features of the present invention will become more readily apparent from the following detailed description of the preferred embodiments taken in conjunction with the accompanying drawings in which.

DESCRIPTION OF THE PREFERRED EMBODIMENTS

Figure 1:
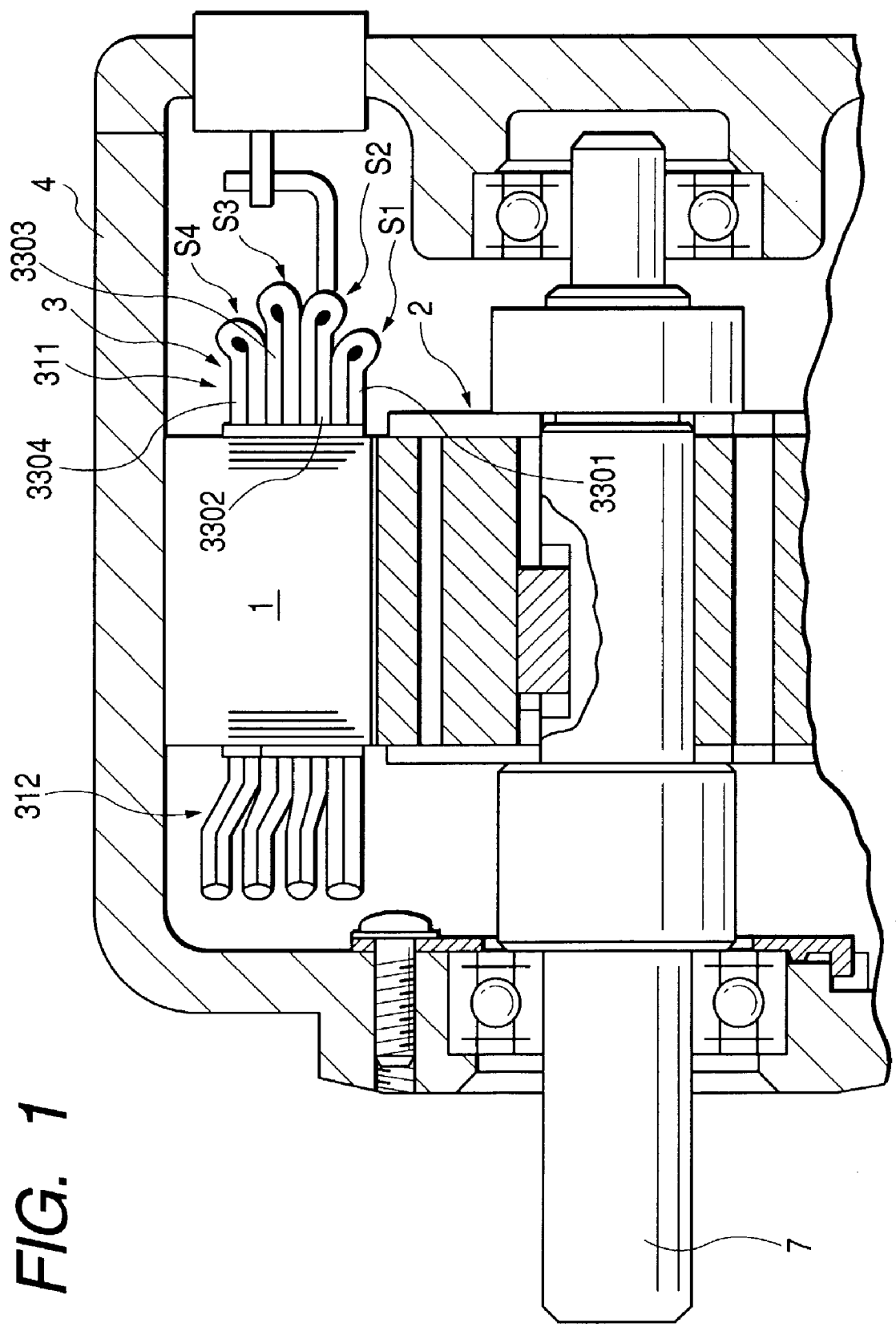
FIG. 1 is a vertical cross-sectional view showing a vehicle driving motor according to an embodiment of the present invention.
Figure 2:
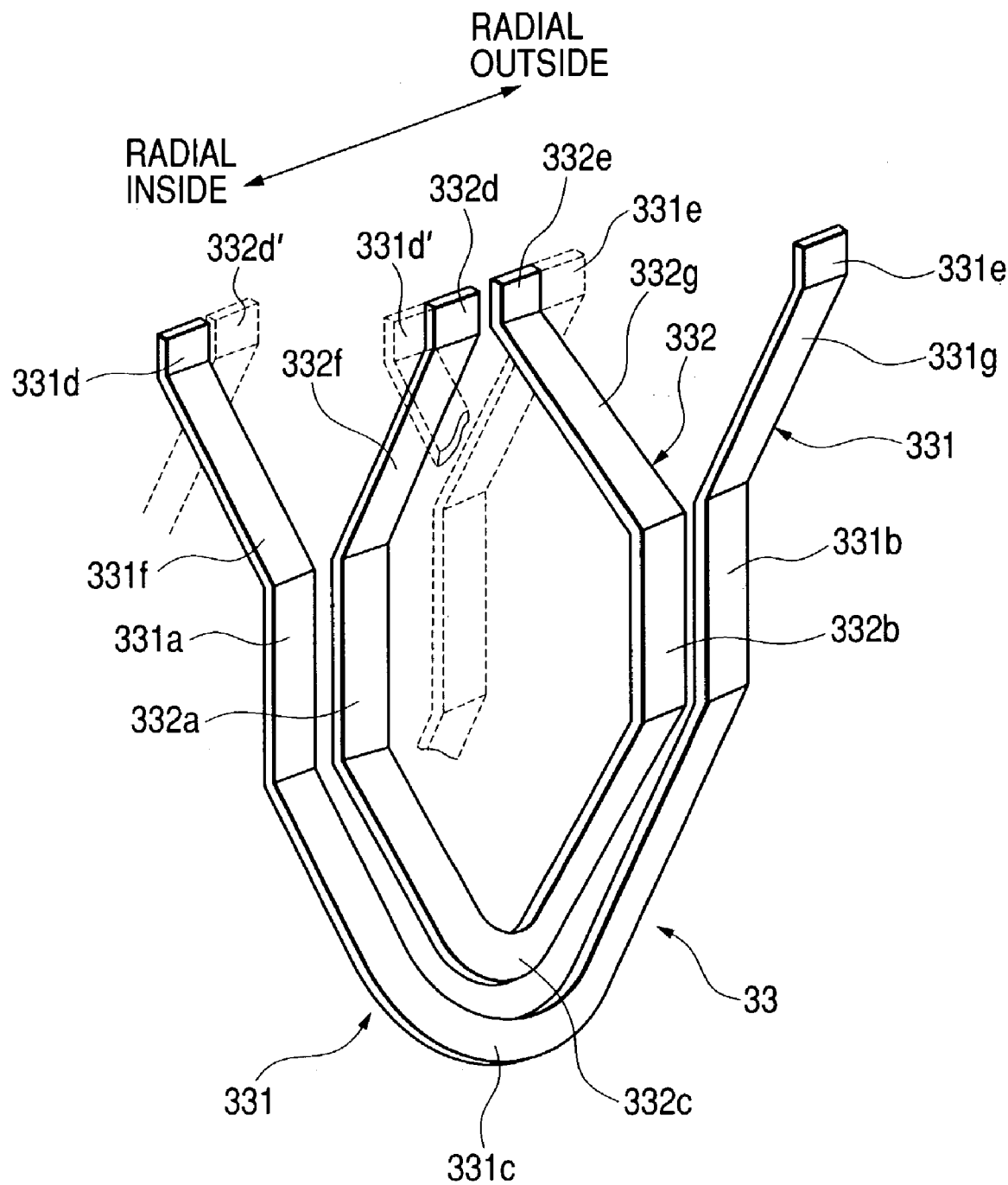
FIG. 2 is a perspective view illustratively showing segments shown in FIG. 1.
Figure 3:
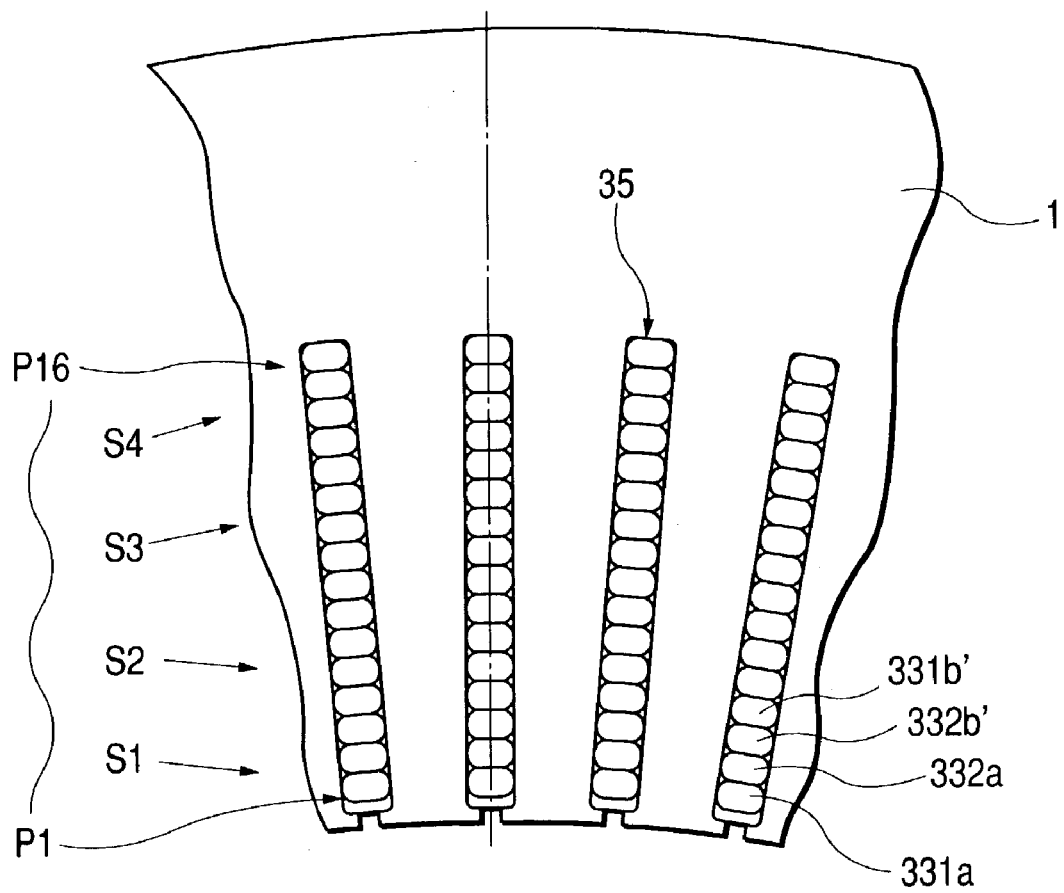
FIG. 3 is a radial partial cross-sectional view showing a stator core shown in FIG. 1.

Referring to the drawings, a description will be given hereinbelow of an example of a high-voltage vehicle electric rotating machine including a sequential segment joining type stator coil according to the present invention. FIG. 1 is an axial cross-sectional view showing the electric rotating machine used as a driving motor for generation of a driving force for a vehicle, with coil end portions of a stator coil being illustratively shown therein. FIG. 2 is a perspective view showing segments constituting a portion of the stator coil, and FIG. 3 is a partial cross-sectional view showing an accommodation state of segments in slots.

(Description of the Entire Configuration)

In FIG. 1, the driving motor is made up of a stator core 1, a rotor 2, a stator coil 3, a housing 4 and a rotary shaft 7. The stator core 1 is fixedly secured onto an inner circumferential surface of a circumferential wall of the housing 4, while the stator coil 3 is wound around slots of the stator core 1. The rotor 2 is of an IPM type and is fixedly fitted over the rotary shaft 7 supported by the housing 4 to be rotatable, with it being located inside the stator core 2 in radial directions. The stator coil 3 is a three-phase armature winding and receives a supply of electricity from a three-phase inverter which is responsive to power from an external battery of approximately 300V.

This driving motor is a permanent magnet type brushless DC motor (synchronous motor) made to generate driving power for a secondary battery vehicle, a fuel cell powered vehicle or a hybrid vehicle, and the rotor construction is replaceable with well-known various types. These various types of synchronous machines themselves are well known and the description thereof will be omitted for brevity.

(Description of Stator Coil 3)

For the construction of the stator coil 3, a predetermined number of segments (segments in the present invention) 33 shown in FIG. 2 are inserted from the one side of the stator core 1 into slots of the stator core 1 so that protruding end portions of each of the segments 33 protrude by a necessary length from the slots on the other side of the stator core 1, and the protruding end portions of each of the segments 33 are twisted by approximately an electrical angle π/2 in a circumferential direction and the tip portions (joining portions) of the protruding end portions of the respective segments 33 are welded in predetermined combinations. The segments 33 are covered with a resin coat except the welding portions, i.e., the tip portions (each equally referred to as an "end tip portion") of the aforesaid protruding end portions and are formed into an elongated U-like configuration. This kind of sequential segment joining type stator coil itself is already well known as mentioned above.

A description will be given hereinbelow of details of the segments 33.

One segment (segment set) 33 is made up of one large segment 331 and a small segment 332 each composed of a generally V-shaped head portion, a pair of in-slot conductor portions extending linearly from both the ends of this head portion and accommodated in slots, and a pair of protruding end portions respectively extending from the tips of both the in-slot conductor portions. Thus, the stator coil 3 is divided into a first coil end section (head side coil end) 311 lying in a ring-like fashion as a whole on one side of the stator core 1, a second coil end section (end side coil end) 312 lying in a ring-like fashion as a whole on the other side of the stator core 1 and slot conductor section lying within the slots.

That is, in FIG. 1, the head side coil end 311 is composed of the head portions of the respective segments 33 while the end side coil end 312 is made up of the protruding end portions of the respective segments 33.

In FIG. 1, four segment sets 33 are inserted in order in a radial direction, where reference numeral 3301 represents a head portion of one segment set 33 of the radial innermost segment set group S1, numeral 3302 designates a head portion of one segment set 33 of a second segment set group S2 when viewed from the radial inside, numeral 3303 denotes a head portion of one segment set of the third segment set group S3 when viewed from the radial inside, and numeral 3304 depicts a head portion of one segment set 33 of the radial outermost segment set group S4, with the four head portions arranged in order in a radial direction constitute the above-mentioned head side coil end 311. However, in FIG. 1, as the end side coil end 312, only eight (four pairs) protruding end portions in total, arranged in a radial direction of two segment set groups, are shown for purpose of the simplification of illustration only.

(Description of Segment 33)

The segment (segment set) 33 will be described hereinbelow with reference to FIG. 2.

The segment (segment set) 33 is composed of a large segment (equally referred to as a "large-turning segment") 331 and a small segment (equally referred to as a "small-turning segment") 332. The large segment 331 and the small segment 332 surrounded by the large segment 331 are referred to as a "segment set".

In the large segment 331, numerals 331a and 331b depict in-slot conductor portions, numeral 331c designates a head portion, and numerals 331f and 331g denote protruding end portions. Each of the tip portions 331d and 331e of the protruding end portions 331f and 331g are joining portions and, hence, is equally referred to as an "end tip portion" or "joining portion". The in-slot conductor portion 331a is referred to as the "innermost layer in-slot conductor portion" while the slot conductor portion 331b is referred to as the "outermost layer in-slot conductor portion".

In the small segment, numerals 332a and 332b represent in-slot conductor portions, numeral 332c designates a head portion, and numeral 332f and 332g denote protruding end portions. Each of the tip portions 332d and 332e of the protruding end portions 332f and 332G are joining portions and, hence, is equally referred to as an "end tip portion" or "joining portion". The in-slot conductor portion 332a is referred to as the "inner-middle layer in-slot conductor portion" while the in-slot conductor portion 332b is referred to as the "outer-middle layer in-slot conductor portion".

The sign 'signifies the same portion as the portions with no sign' in a large segment or small segment which is not shown. Therefore, in FIG. 2, the joining portion 331d and the joining portion 332d' adjoining each other in a radial direction are welded to each other, and the joining portion 332d and the joining portion 331d' adjoining each other in a radial direction are welded to each other, and the joining portion 332e and the joining portion 331e' adjoining each other in a radial direction are welded to each other.

In FIG. 2, in a case in which the innermost layer in-slot conductor portion 331a and the inner-middle layer in-slot conductor portion 332a are accommodated in predetermined slots of a rotor core 71, in the same segment 331, 332, the outermost layer in-slot conductor portion 331b and the outer-middle in-slot conductor portion 332b are accommodated in slots separated by approximately predetermined odd pole pitches T (for example, one pole pitch (electrical angle π))) from the first-mentioned predetermined slots. The head portion 332c of the small segment 332 is located to be surrounded by the head portion 331c of the large segment 331.

(Location of Segment Set within Slots)

FIG. 3 shows a location state of segment sets in slots.

In a slot designated at reference numeral 235, 16 conductor accommodation positions P1 to P16 are set in a radial direction, and one in-slot conductor portion is accommodated at each of the conductor accommodation positions P1 to P16. Each of the slots 35 accommodates four segment set groups S1 to S4 in order in a radial direction and the conductor accommodation positions P1 to P4 accommodate the segment set group S1, the conductor accommodation positions P4 to P8 accommodate the segment set group S2, the conductor accommodation positions P9 to P12 accommodate the segment set group S3, and the conductor accommodation positions P13 to P16 accommodate the segment set group S4. Each of the segment set groups S1 to S4 is made up of a large number of segments 33 aligned in circumferential directions.

Figure 4:
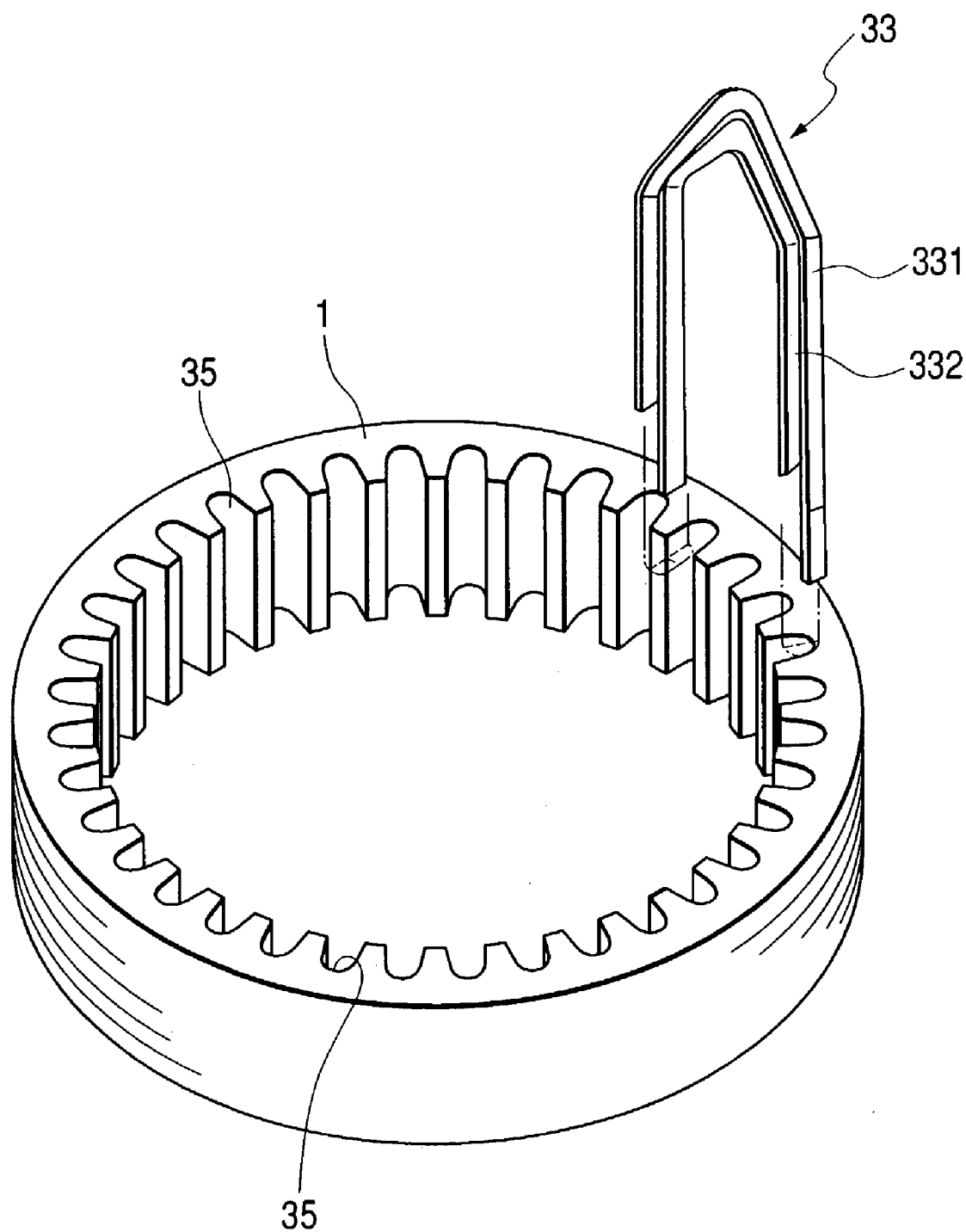
FIG. 4 is a perspective view illustratively showing a state immediately before the insertion of a segment set into a slot.

A detailed description will be given hereinbelow of one example of the innermost segment set group S1. The innermost layer in-slot conductor portion 331a is located on the radial innermost side of the slot 35 of the stator core 1 and the inner-middle layer in-slot conductor portion 332a, the outer-middle layer in-slot conductor portion 332b' and the outermost layer in-slot conductor portion 331b' are then successively located in this order toward the radial outward direction, and finally, each of the slots 35 accommodates four in-slot conductor portions in a line in the form of four layers. In FIG. 3, the in-slot conductor portions 331b' and 332b' belong to a large segment 331 and a small segment 332 which are different from the large segment 331 and the small segment 332 having the in-slot conductor portions 331*a* and 332*a* respectively. Naturally, the other segment set groups S2 to S4 are located and constructed in like manner. FIG. 4 is an illustration of a state in which he segment (segment set) 33 comprising the large segment 331 and the small segment 332 is inserted into the slot 35.

(Description of Configuration of Three-Phase Stator Coil)

Figure 9:
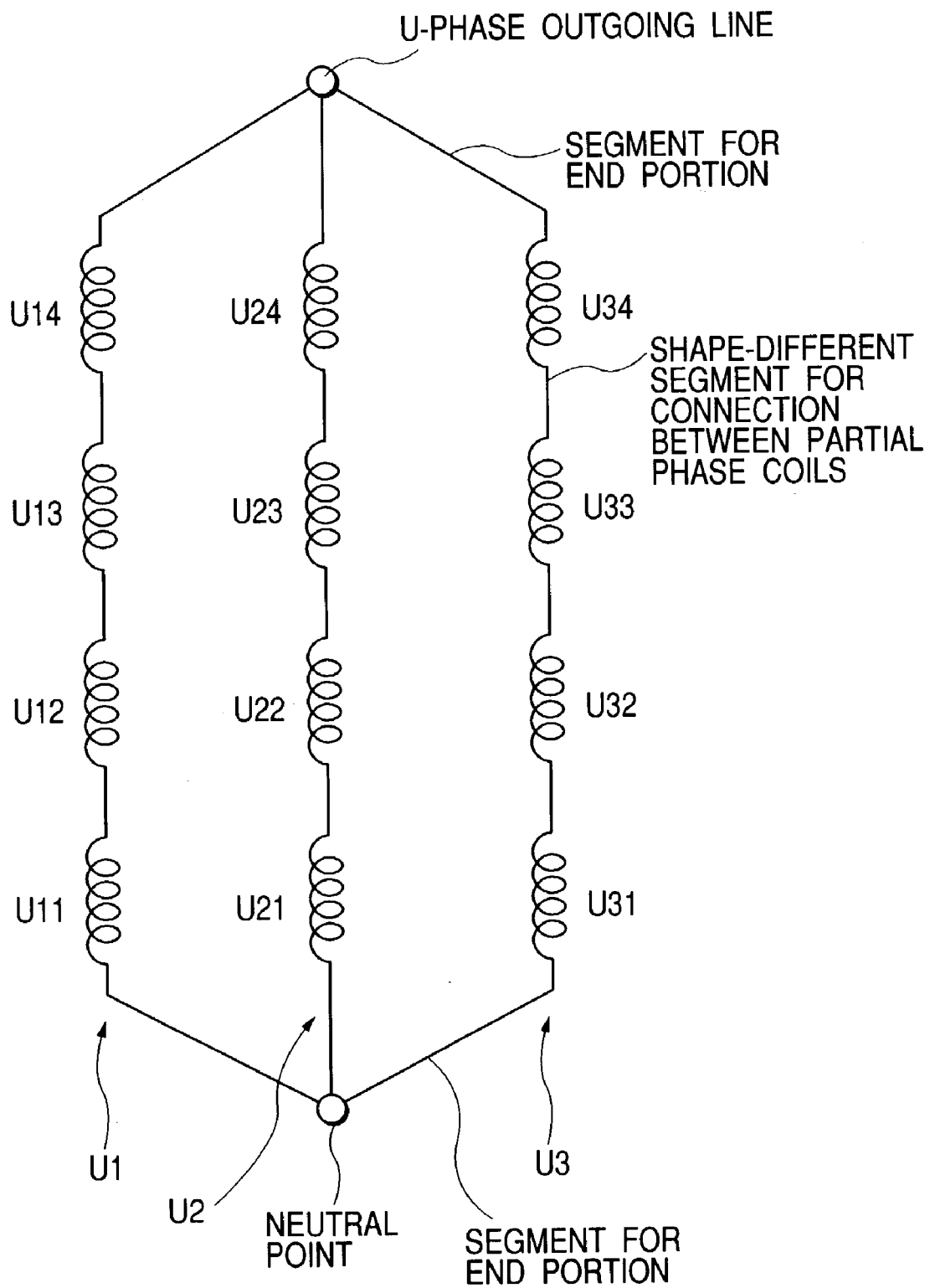
FIG. 9 is an illustration of U-phase connections of a stator coil.

Referring to FIG. 9, a description will be given hereinbelow of connections of a three-phase stator coil comprising four segment set groups S1 to S4 aligned in a radial direction. FIG. 9 shows a U-phase coil.

For one magnetic pole pitch, there are 9 slots (3 in-phase slots, 3 phases), and magnetic poles are 12 in number and slots are 108 in number. Three adjacent slots organize an in-phase slot group to which an in-phase phase voltage is applied. As mentioned above, in one slot, the conductor accommodation positions P1 to P16 are formed in a radial direction and each of the conductor accommodation positions P1 to P16 accommodates one in-slot conductor portion.

The segment set group S1 accommodated at the four, i.e., first to fourth, conductor accommodation positions P1 to P4, when viewed from the radial innermost side of each slot, are connected by means of wave winding or the like to form three first partial phase coils per phase. In FIG. 9, U11, U21 and U31 designate the first partial phase coils. The partial phase coils U11, U12 and U13 are accommodated in different slots of three slots constituting an adjoining in-phase slot group.

The segment set group S2 accommodated at the four, i.e., fifth to eighth, conductor accommodation positions P5 to P8, when viewed from the radial innermost side of each slot, are connected by means of wave winding or the like to form three second partial phase coils per phase. In FIG. 9, U12, U22 and U3 designate the second partial phase coils. The partial phase coils U12, U22 and U32 are accommodated in different slots of three slots constituting an adjoining in-phase slot group.

The segment set group S3 accommodated at the four, i.e., ninth to twelfth, conductor accommodation positions P9 to P12, when viewed from the radial innermost side of each slot, are connected by means of wave winding or the like to form three third partial phase coils per phase. In FIG. 9, U13, U23 and U33 designate the third partial phase coils. The partial phase coils U13, U23 and U33 are accommodated in different slots of three slots constituting an adjoining in-phase slot group.

The segment set group S4 accommodated at the four, i.e., thirteenth to sixteenth, conductor accommodation positions P13 to P16, when viewed from the radial innermost side of each slot, are connected by means of wave winding or the like to form three fourth partial phase coils per phase. In FIG. 9, U14, U24 and U34 designate the fourth partial phase coils. The partial phase coils U14, U24 and U34 are accommodated in different slots of three slots constituting an adjoining in-phase slot group.

In addition, the partial phase coils U11, U12, U13 and U14 are accommodated in, of three adjacent slots constituting an in-phase slot group, the first slot when viewed from one circumferential side, and the partial phase coils U21, U22, U23 and U44 are accommodated in, of the three adjacent slots constituting the in-phase slot group, the middle slot when viewed from one circumferential side, and further the partial phase coils U31, U32, U33 and U34 are accommodated in, of three adjacent slots constituting the in-phase slot group, the last slot when viewed from one circumferential side.

The partial phase coils U11, U12, U13 and U14, which are in adjoining relation to each other, are sequentially connected to form a serial phase coil circuit U1, and the partial phase coils U21, U22, U23 and U24, which are in adjoining relation to each other, are sequentially connected to form a serial phase coil circuit U2, and further the partial phase coils U31, U32, U33 and U34, which are in adjoining relation to each other, are sequentially connected to form a serial phase coil circuit U3. These connections between the adjacent partial phase coils in a radial direction are made such that a shape-different U-shaped segment is inserted into ones of free conductor accommodation positions of two adjacent partial phase coils in a radial direction, as well known so far.

For example, in the partial phase coil U12, one normal segment (preferably, a large segment) is drawn out to offer a pair of free conductor accommodation positions, and free conductor accommodation positions are prepared likewise in the partial phase coil U13, and the aforesaid shape-different U-shaped segment is inserted into one of the pair of free conductor accommodation positions in the partial phase coil U12 and one of the free conductor accommodation positions in the partial phase coil U13, thus making a connection between the partial phase coils U12 and U13.

Moreover, the shape-different U-shaped segment is inserted into the remaining one free conductor accommodation position of the partial phase coil U12 and one of free conductor accommodation positions formed likewise in the partial phase coil U11, thus making a connection between the partial phase coils U12 and U11.

A shape-different segment for a neutral point (or for an outgoing terminal) is inserted into the remaining one free conductor accommodation position of the partial phase coil U11 and a shape-different segment for an outgoing terminal (or for a neutral point) is similarly inserted into the remaining one free conductor accommodation position of the partial phase coil U14.

The serial phase coil circuits U1, U2 and U3 are connected at their both ends to make a parallel connection, thus forming a U-phase coil.

A standard manufacturing process for an ordinary sequential segment joining type stator coil will first be described, then followed by a description of a manufacturing process according to this embodiment.

(Standard Head Twisting Process)

First of all, prepared are the necessary numbers of two types of non-spread pine-needle-like segments for small segments 332 and large segments 331. Both the leg portions of these pine-needle-like segments extend linearly in approximately adjacent relations to each other, and the head portions thereof are in acutely bent conditions. Then, each of the pine-needle-like segments is processed into a U-shaped segment and a pair of in-slot conductor portions of the segment are separated by approximately a pole pitch from each other in a circumferential direction while, in the following step, the necessary number of segments are spatially located (aligned in a circumferential direction) to be simultaneously inserted in slots of a stator core.

This head twisting process will be described hereinbelow with reference to FIGS. 5 and 6.

Figure 5:
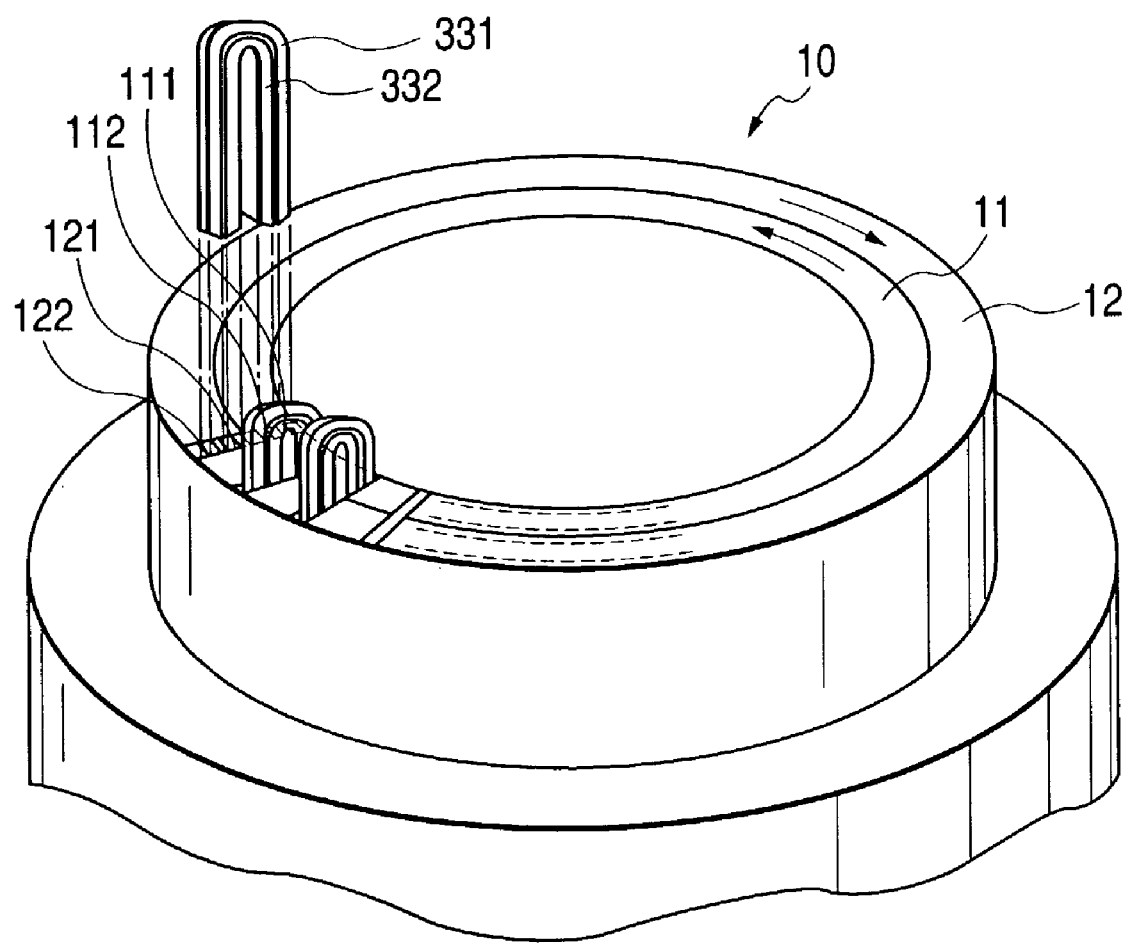
FIG. 5 is a cross-sectional view illustratively showing a state of the insertion of segments into rings of a head twisting apparatus.

FIG. 5 shows a state before the insertion of a segment in the head twisting process. In FIG. 5, numeral 10 represents a head twisting apparatus, numeral 11 denotes a small ring, and numeral 12 depicts a large ring. The small ring 11 and the large ring 12 are coaxially disposed to be relatively rotatable. In the large ring 11, there are made pairs of holes 121 and 122 each aligned in radial directions and arranged at a predetermined pitch in circumferential directions, and in the small ring 12, there are made pairs of holes 111 and 112 each aligned in radial direction and arranged at the same pitch as that of the holes 121 and 122 in circumferential directions. The holes 111 to 122 are arranged in a line in a radial direction. Both the in-slot conductor portions of a large segment (large-turning segment) 331 are inserted into the innermost hole 111 and the outermost hole 122 while both the in-slot conductor portions of a small segment (small-turning segment) 332 are inserted into the hole 112 outside the innermost hole 111 and the hole 121 inside the outermost hole 122.

Figure 6:
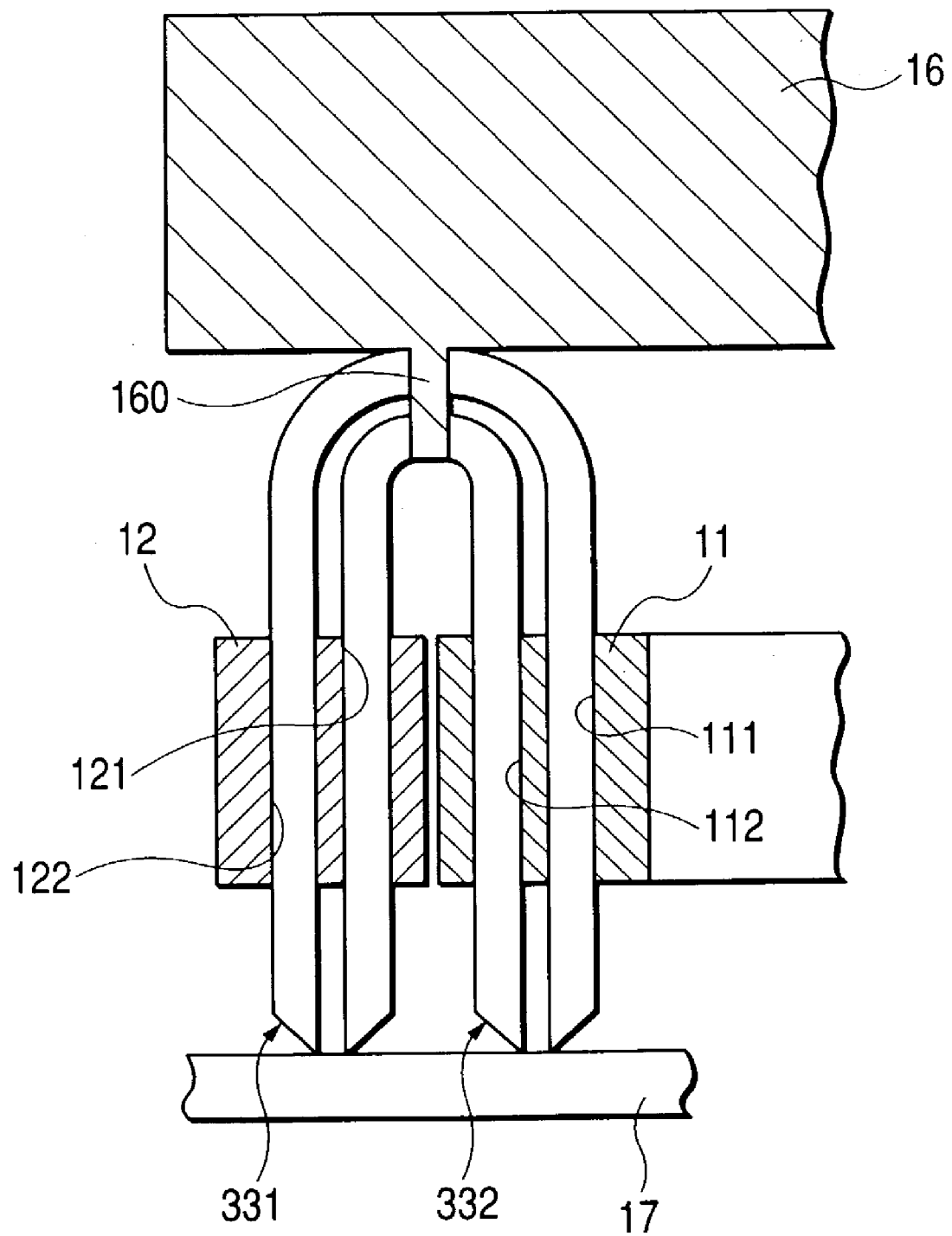
FIG. 6 is a vertical cross-sectional view illustratively showing a head twisting apparatus.

FIG. 6 shows a state in which all the large segments 331 and all the small segments 332 are inserted into the holes 111, 112, 121 and 122 of the small ring 11 and the large ring 12. In FIG. 6, numeral 16 designates a head pressing plate placed above the small ring 11 and the large ring 12 in an axial direction. On a lower end surface of the head pressing plate 16, there are placed a pair of claws (only one illustrated) 160 for holding a top of the head portion of the large segment 331 and a top of the head portion of the small segment, which are paired and exist at the same position in a circumferential direction, from both sides in circumferential directions. That is, after the respective segments 33 are inserted into the holes 111, 112, 121 and 122, the pressing plate 16 is lowered so that each pair of claws 160 catch the top of the head portion of the large segment 331 and the top of the head portion of the small segment 332, lying at the same position in circumferential directions, from both sides in the circumferential directions.

Following this, the large ring 12 and the small ring 11 are rotated by the half of pole pitch in opposite directions with respect to the stationary head pressing plate 16, which makes the leg portions of all the segments 33 spread by one pole pitch in circumferential directions.

During the rotations of the rings 11 and 12, since the tops of the head portions of the segments displace toward the rings 11 and 12 in an axial direction in accordance with the rotations of the rings 11 and 12, the head pressing plate 16 is accordingly displaced in the axial direction. In FIG. 6, numeral 17 denotes a limiting plate for preventing the large segment 331 and the small segment 332 from dropping deeply. It is also appropriate that the limiting plate 17 is divided into an outside limiting plate on which the two radial outside leg portions are placed and an inside limiting plate on which the two radial inside leg portions are put, and the inside limiting plate is fixedly secured to the ring 11 and rotated integrally with the ring 11 while the outside limiting plate is fixedly secured to the ring 12 and rotated together with the ring 12.

Thereafter, with the respective segments 33 being held by the head pressing plate 16, the small ring 11 and the large ring 12 are detached from the segments 33.

(Standard End Portion Insertion Process)

Subsequently, as partially shown in FIG. 4, the small-turning U-shaped segments 332 are pulled out from both the hole-made rings and are then inserted into the inner-middle layer positions and outer-middle layer positions of the slots 35 of the stator core 1 and the large-turning U-shaped segments 331 are drawn out from both the hole-made rings and are then inserted into the innermost layer positions and outermost layer positions of the slots 35 of the stator core 1.

At this time, if the head pressing plate 16 holds the respective segments to prevent them from falling into a disordered condition, the respective segments can simultaneously be inserted into the corresponding slots. After this, the head pressing plate 16 is removed.

Incidentally, the process up to the insertion of the small-turning U-shaped segment 332 and the large-turning U-shaped segment 331 into the slots 35 of the stator core 1 is not limited to the process mentioned above, but various processes other than this are also acceptable.

(Standard End Twisting Process)

A description will be given hereinbelow of a twisting formation process on end portions of the segments 33 inserted into the slots as mentioned above.

In this embodiment, an end portion 331g (equally referred to as an outer layer side end portion) connected to the outermost layer in-slot conductor portion 331b of the large segment 331 is twisted to one side in a circumferential direction while an end portion 331f (equally referred to as an inner layer side end portion) connected to the innermost layer in-slot conductor portion 331a of the large segment 331 is twisted toward the other side in the circumferential direction. An end portion 332f (equally referred to as an inner layer side end portion) connected to the inner-middle layer in-slot conductor portion 332a of the small segment 332 is twisted toward one side in a circumferential direction and an end portion 332g (equally referred to as an outer layer side end portion) connected to the outer-middle layer in-slot conductor portion 332b of the small segment 332 is twisted toward the other side in the circumferential direction. The total sum of the circumferential twisting quantities of the conductor portions 331f and 332f is set to be one pole pitch, while the total sum of the circumferential twisting quantities of the conductor portions 331g and 332g is set to be one pole pitch.

Figure 7:
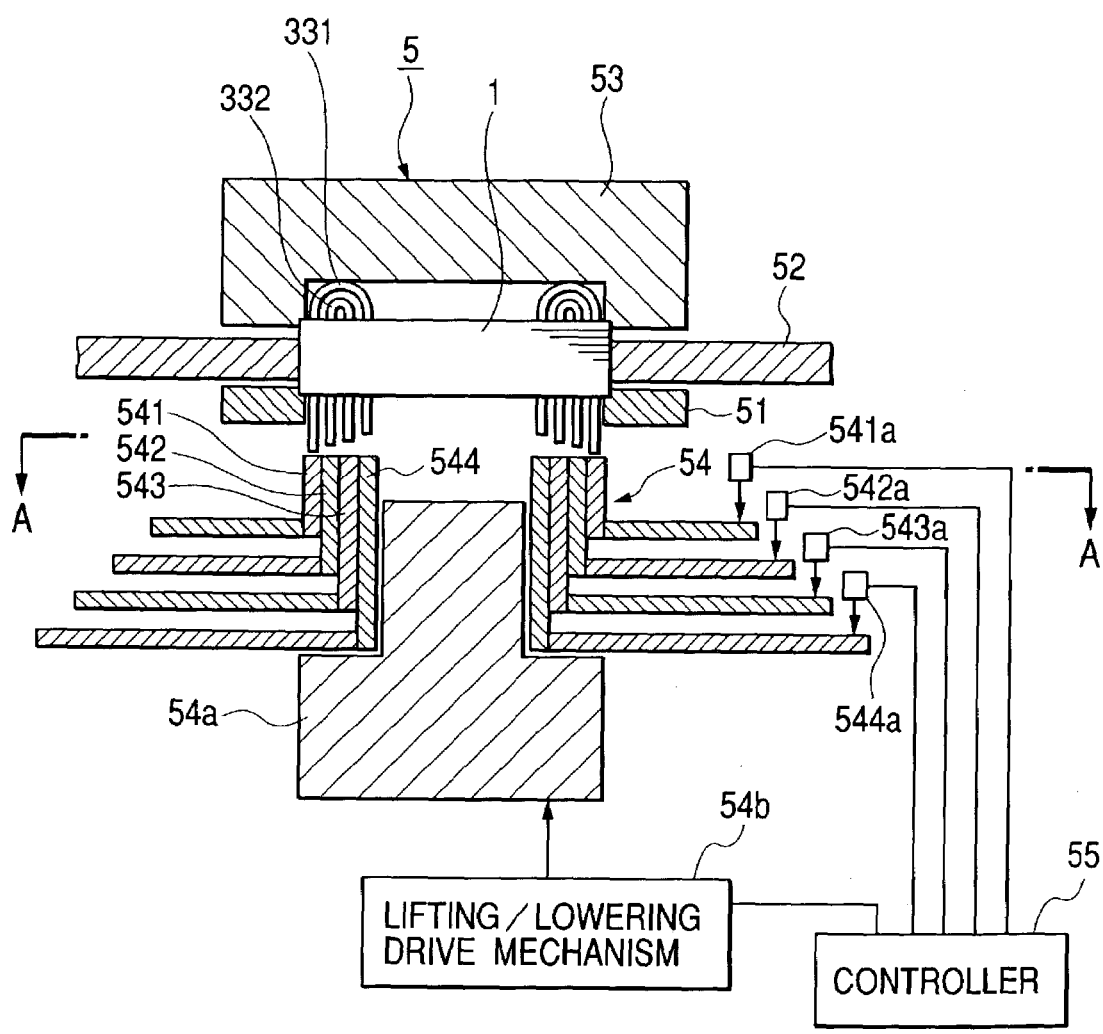
FIG. 7 is a vertical cross-sectional view illustratively showing a head twisting apparatus.
Figure 8:
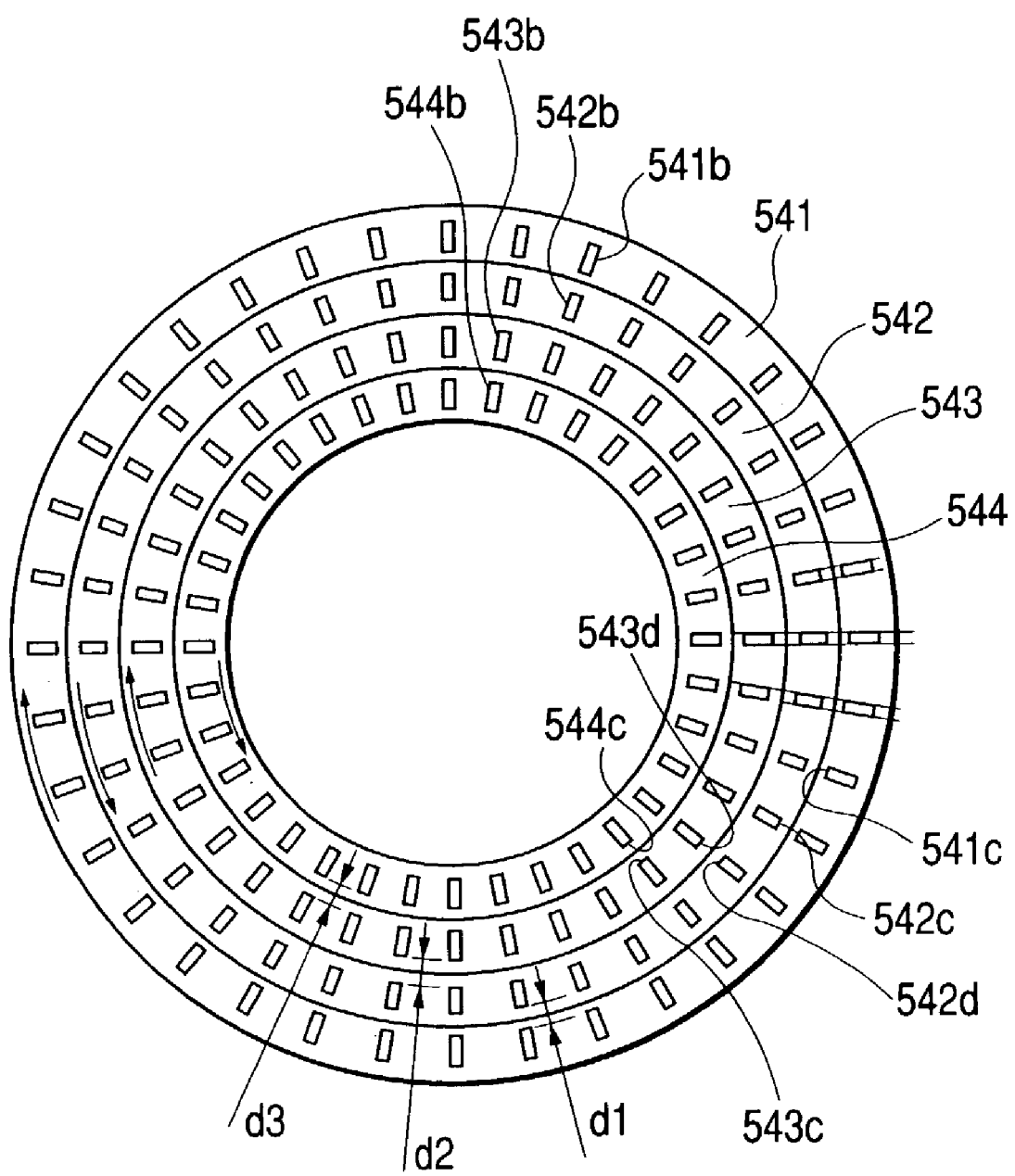
FIG. 8 is a plan view showing rings of an end twisting apparatus.

Referring to FIGS. 7 and 8, a more detailed description will be given hereinbelow of a twisting processing of a segment set comprising the aforesaid large segment 331 and small segment 332. FIG. 7 is a vertical cross-sectional view showing a stator coil twisting apparatus 500 and FIG. 8 is a cross-sectional view taken along arrow lines A—A of FIG. 7.

First, a description will be given hereinbelow of a construction of the stator coil twisting apparatus 500.

The stator coil twisting apparatus 500 is composed of a work bearing member 51 for bearing an outer circumferential portion of the stator core 1, a damper 52 for limiting the radial movements of the stator core 1 to hold the stator core 1, a work pressing member 53 for preventing the stator core 1 from floating, a twisting shaping section 54 for twisting the protruding leg portions of the segments 33 which come out from one end of the stator core 1, a lifting/lowering shaft 54a for driving the twisting shaping section 54 in axial directions, rotational drive mechanisms 541a to 544a for rotationally driving the twisting shaping section 54 in circumferential directions, a lifting/lowering drive mechanism 54b for shifting the lifting/lowering shaft 54a in axial directions, and a controller 55 for controlling the rotational drive mechanisms 541a to 544a and the lifting/lowering drive mechanism 54b.

In the twisting shaping section 54, four cylindrical twisting jigs 541 to 544 are located coaxially and disposed so that their tip surfaces are made uniform. The twisting jigs 541 to 544 are independently made rotatable by the rotational drive mechanisms 541a to 544a, respectively, and are simultaneously lifted and lowered in a manner such that the lifting/lowering shaft 54a is lifted and lowered by the lifting/lowering drive mechanism 54b.

As shown in FIG. 8, the tip surfaces of the twisting jigs 541 to 544 have segment insertion portions 541b to 544b bored to hold the tip portions joining portions) of the end portions 331f, 331g, 332f and 332g of the inserted segments 33. These segment insertion portions 541b to 544b are formed to be arranged in circumferential directions of the twisting jigs 541 to 544, and the number thereof is equal to the total number of the slots 35 of the stator core 1.

As shown in FIG. 8, with respect to the segment insertion portions 541b to 544b, partitions 541c to 544c, 542d and 543d are provided in order to prevent communications between the segment insertion portions 541b to 544b adjacent to each other in radial directions. The thicknesses of the partitions 541c to 544c, 542d and 543d are made such that, when viewed from the radial outside, a gap d2 defined by the partitions 542d and 543d between the second layer and the third layer is set to be larger than a gap d1 defined by the partitions 541c and 542c between the first layer and the second layer and a gap d3 defined by the partitions 543c and 544c between the third layer and the fourth layer.

Secondly, a description will be given hereinbelow of an operation of the stator coil twisting apparatus 500.

The stator core 1 in which the segments 33 are placed in the slots 35 is set on the work bearing member 51. Then, an outer circumferential portion of the stator core 1 is fixedly secured to the damper 52. Subsequently, an upper portion of the stator core 1 and the head portions 331c of the large segments 331 are pressed by the work pressing member 53 to limit the vertical movements of the stator core 1 and the segments 33.

After the stator core 1 in which the segments 33 are placed is fixed by the damper 52 and the work bearing member 53, the twisting shaping section 54 is lifted by the lifting/lowering shaft 54a so that the end portions 331f, 331g, 332f and 332g of the segments 33 are inserted into the segment insertion portions 541b to 544b made in the respective twisting jigs 541 to 544.

Only the tip portions, i.e., the portions to be used as joining portions thereafter, of the end portions 331f, 331g, 332f and 332g of the segments 33 can be inserted into the segment insertion portions 541b to 544b. The end portions 331f, 331g, 332f and 332g of the segments 33 are formed into a tapered configuration, which enables smooth insertion into the segment insertion portions 541b to 544b.

After the end portions 331f, 331g, 332f and 332g of the segments 33 are inserted into the segment insertion portions 541b to 544b of the twisting shaping section 54, the twisting shaping section 54 is rotated and lifted/lowered by the rotational drive mechanisms 541a to 544a and the lifting/lowering drive mechanism 54b.

Furthermore, a description will be given hereinbelow of the rotation of the twisting shaping section 54.

The twisting jigs 541 and 543 are rotated clockwise by a first angle while the twisting jigs 542 and 544 are rotated counterclockwise by a second angle. At this time, the first and second angles are not limited to being equal in magnitude to each other, and it is also acceptable provided that the total sum of both the angles corresponds to the necessary slot pitch.

Following this, under the control of the lifting/lowering drive mechanism 54b and the rotational drive mechanisms 541a to 544a, the twisting shaping section 54 is rotated and lifted so that, of the end portions 331f, 331g, 332f and 332g of the segments 33, the lengths of the portions from the exits of the slots 35 to the entrances of the segment insertion portions 541b to 544b are kept to be constant. At this time, preferably, the end portions 331f, 331g, 332f and 332g of the segments 33 are rotated and lifted to draw circular-arc-like loci. For preventing the deformation of the segments 33 due to the spring back, it is preferable that the twisting to draw this circular-arc-like locus is made up to an angle which exceeds an angle corresponding to the half of a pole pitch (T/2) by a predetermined value.

Thereafter, the lifting/lowering drive mechanism 54b and the rotational drive mechanisms 541a to 544a are rotated in a direction opposite to that of the above-mentioned process to be lowered. In this way, the twisting process for the segments 33 reaches completion, and the twisting shaping section 54 is lowered so that the end portions 331f, 331g, 332f and 332g of the segments 33 are removed from the segment insertion portions 541b to 544b of the twisting jigs 541 to 544. After the removal of the segments 33, the twisting shaping section 54 is rotated by the rotational drive mechanisms 541a to 544a to return to the original position. Lastly, the damper 52 and the work pressing member 53 are detached and the stator having the twisted segments 33 are removed.

In the end, in this twisting process, the end portions of the segments 33 are rotationally displaced in only circumferential directions to bring the segments 33 in circumferential directions and the end portions of the segments 33 are then displaced in circumferential directions and in axial directions to incline the segments 33 deeply and, following this, the end portions of the segments 33 are displaced in circumferential directions and axial directions to exceed a predetermined processing degree so that the segments 33 are excessively inclined deeply and, thereafter, the end portions of the segments 33 are restored to the predetermined processing degree.

The twisting shaping section 54 is relatively shifted not only in circumferential directions but also in axial directions with respect to the stator core 1. Therefore, the end portions 331f, 331g, 332f and 332g of the segments 33 can be twisted to draw circular-arc-like loci so that, of the end portions 331f, 331g, 332f and 332g of the segments 33, the portions from the exits of the slots 35 to the entrances of the segment insertion portions 541b to 544b, that is, the end portions 331f, 331g, 332f and 332g except the end tip portions (joining portions) 331d, 331e, 332d and 332e, are kept to be constant in length, thereby preventing the segments 33 from falling out from the segment insertion portions 541b to 544b.

Moreover, only the end tip portions (joining portions) 331d, 331e, 332d and 332e of the segments 33 are inserted into the segment insertion portions 541b to 544b, and, likewise, the segments 33 do not fall out from the segment insertion portions 541b to 544b.

(Standard Welding Process)

A description will be given hereinbelow of a standard welding process. This process is substantially the same as the conventional process.

As shown in FIGS. 1 and 2, after the aforesaid twisting of the end portions of the segments, the first and second layer end tip portions (joining portions) are welded from the inside in a radial direction and the third and fourth layer end tip portions (joining portions) are welded from the inside in a radial direction, thus completing the stator coil 31. The welding is achieved by means of arc welding.

(Description of Welding Process Constituting Feature of this Embodiment)

In addition, referring to FIG. 10, a description will be given hereinbelow of an end tip portion pair welding process which is an feature of this embodiment In FIG. 10, numeral 2 represents a torch functioning as a welding electrode movable in radial directions and in circumferential directions by a drive unit, not shown, numeral 13 designates end tip portion pair aligned at a predetermined pitch in radial directions and in circumferential directions to be welded, numeral 14 denotes an end skewing portion pair, and character c depicts a boundary between the end tip portion pair 13 and the end skewing portion pair 14. An insulating coat is removed from a surface of the end tip portion pair 13, while the end skewing portion pair 14 is covered with an insulating coat.

In addition, numeral 1000 represents a radial-outside basal electrode block, numeral 2000 signifies a radial-inside basal electrode block, and numeral 3000 indicates a circular-arc-like auxiliary electrode (interposition member in the present invention). The circular-arc-like auxiliary electrode 300 is interposed between a pair of end tip portion pairs 13, 13 adjacent to each other in a radial direction, and the both the basal electrode blocks 1000 and 2000 holds and press the proximal portions of the pair of end tip portion pairs and the circular-arc-like auxiliary electrode 3000 therebetween. Both the basal electrode blocks 1000 and 2000 and the circular-arc-like auxiliary electrode 3000 are made of copper, and the circular-arc-like auxiliary electrode 3000 is formed into a circular-arc configuration having a predetermined length in a circumferential direction, that is, in a vertical direction on the paper, and the axial cross section thereof has a generally square-bar-like configuration. It is also possible to use the bar-like electrodes 12x shown in FIG. 14.

A welding operation is as follows.

Both the basal electrode blocks 1000 and 2000 and the circular-arc-like auxiliary electrode 3000 are shifted by one circumferential pitch of the end tip portion pair 13 to be brought into contact with the side surfaces of the end tip portion pair 12 to be welded. Incidentally, in a case in which both the basal electrode blocks 1000 and 2000 and the circular-arc-like auxiliary electrode 3000 have a sufficient length in a circumferential direction, it is also appropriate that, in a state where these the basal electrode blocks 1000 and 2000 and the circular-arc-like auxiliary electrode 3000 are placed in a fixed condition, only the torch 2 is shifted in a circumferential direction to weld a plurality of end tip portion pairs adjacent to each other in the circumferential direction and, thereafter, both the basal electrode blocks 1000 and 2000 and the circular-arc-like auxiliary electrode 3000 are shifted by necessary end tip portion pair pitches in the circumferential direction. This shifting can be carried out in the circumferential direction or can also be carried out by a necessary quantity in the circumferential direction and set after they are once removed axially and outwardly. In a case in which the circular-arc-like auxiliary electrode 3000 has a ring-like configuration, there is no need to carry out such circumferential displacement.

Immediately before the welding, both the basal electrode blocks 1000 and 2000 hold the pair of end tip portion pairs 13 and the circular-arc-like auxiliary electrode 3000 under a predetermined pressure therebetween in radial directions.

Figure 14:
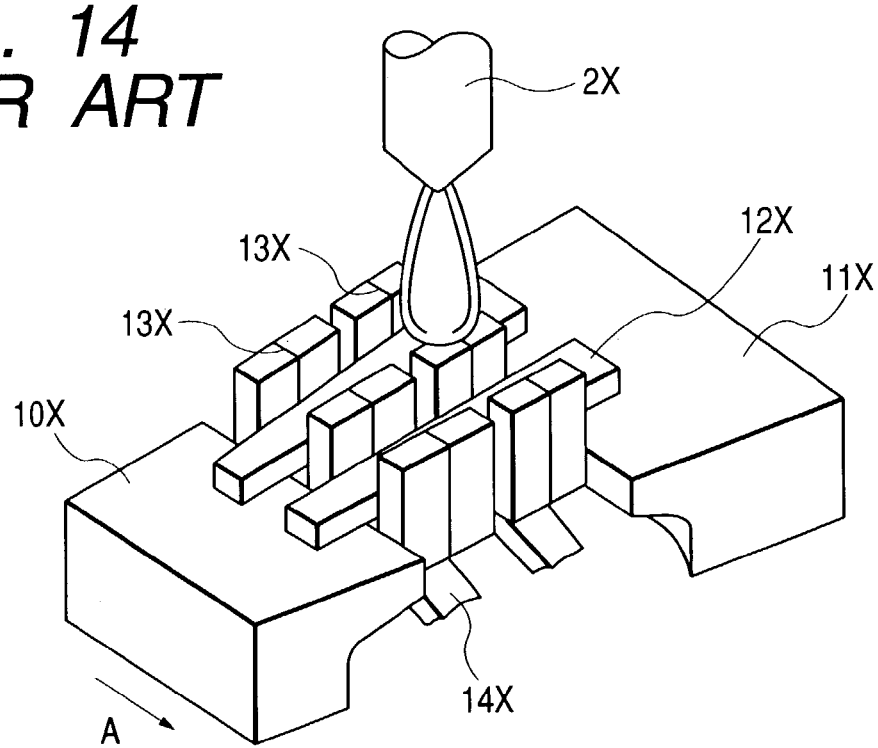
FIG. 14 is an illustration of a conventional welding process.
Figure 15:
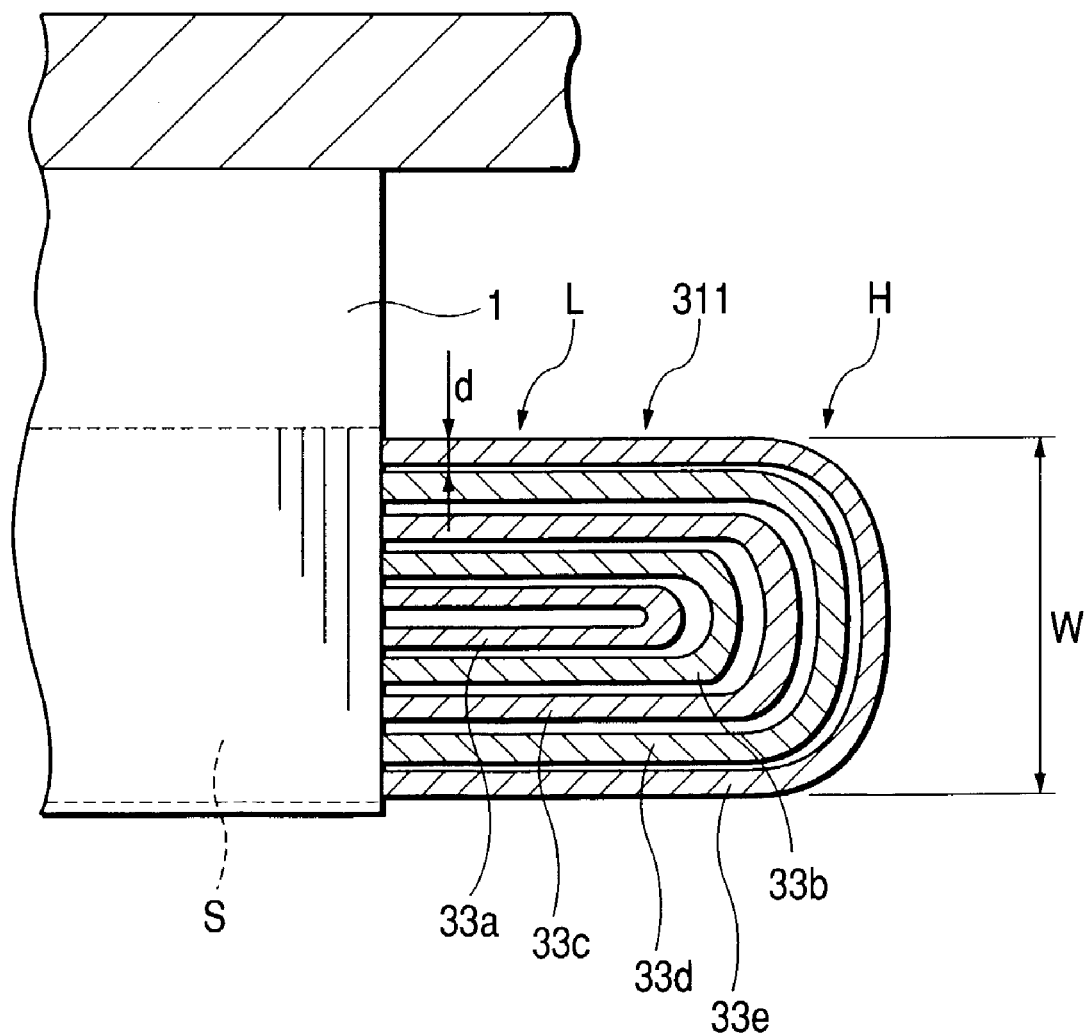
FIG. 15 is a radial cross-sectional view illustratively showing head side coil ends of a conventional segment set.

In this connection, in a case in which the bar-like electrodes 12x are provided as shown in FIG. 14, this bar-like electrode is fitted in all circumferential spacings between the end tip portion pairs 13 from the outside in radial directions.

In this case, since the circular-arc-like auxiliary electrode 3000 adjoins a plurality of end tip portion pairs 13 adjacent to each other in a circumferential direction, the circular-arc-like auxiliary electrode 3000 extending in a circumferential direction and the bar-like electrode 12x are disposed to overlap with each other in an axial direction.

Subsequently, the torch electrode 2 is placed in opposed relation to the tip surfaces of the end tip portion pair 13, to be welded, in a state separated by a predetermined distance therefrom. This torch electrode 2 is designed to be movable in radial directions or in circumferential directions through the use of a three-dimensional drive apparatus (usually, a welding robot).

For the welding, a predetermined voltage is applied among the torch electrode 2, both the basal electrode blocks 1000, 2000 and the circular-arc-like auxiliary electrode 3000 so that arc occurs between the torch electrode 2 and the tip surfaces of the end tip portion pair 13 to melt the tip portions of the end tip portion pair 13. For the feeding to the circular-arc-like auxiliary electrode 3000, it is possible that end portions extending in circumferential directions of the circular-arc-like auxiliary electrode 3000 are bent in axial and outward directions so that a cable is connected thereto.

After the completion of the melting, the torch electrode 2 is shifted in a radial direction or in a circumferential direction to weld all the end tip portion pairs 13 held between both the basal electrode blocks 1000 and 2000.

Following this, both the basal electrode blocks 1000 and 2000 and the circular-arc-like auxiliary electrode 3000 are again shifted by one end tip portion pair pitch in a circumferential direction to again repeat the above-mentioned operation.

The above-described welding method can uniformize the positions of the end tip portion pairs 13.

(First Modification Mode)

Figure 11:
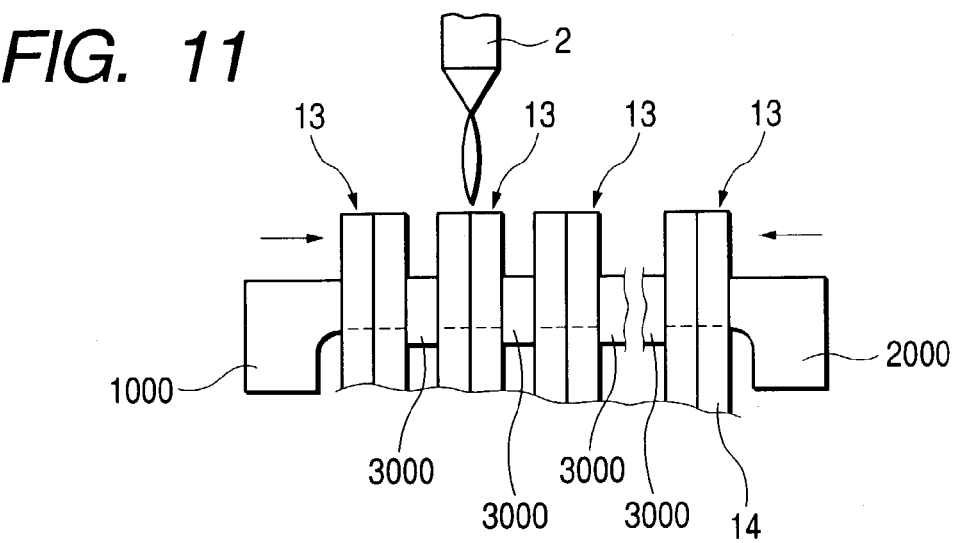
FIG. 11 is an illustration of a welding process in a proper mode.

In the above-mentioned mode, the circular-arc-like auxiliary electrode 3000 acting as an interposition member is made of copper, it is also possible to manufacture it, for example, using a heat-resistant resin. In this case, it is possible to secure the positioning effect, and it is unnecessary to remove the circular-arc interposition member. FIG. 11 shows a welding state in a case in which a large number of end tip portion pairs 13 are aligned in a radial direction.

(Second Modification Mode)

In the above-mentioned mode, the circular-arc-like auxiliary electrode 3000 acting as an interposition member is made of copper, it is also possible to employ, for example, a circular-arc-like metallic member having a surface which is coated with an insulating ceramic film. This enables the interposition member to absorb heat of the end tip portion pairs 13.

(Third Modification Mode)

Figure 12:
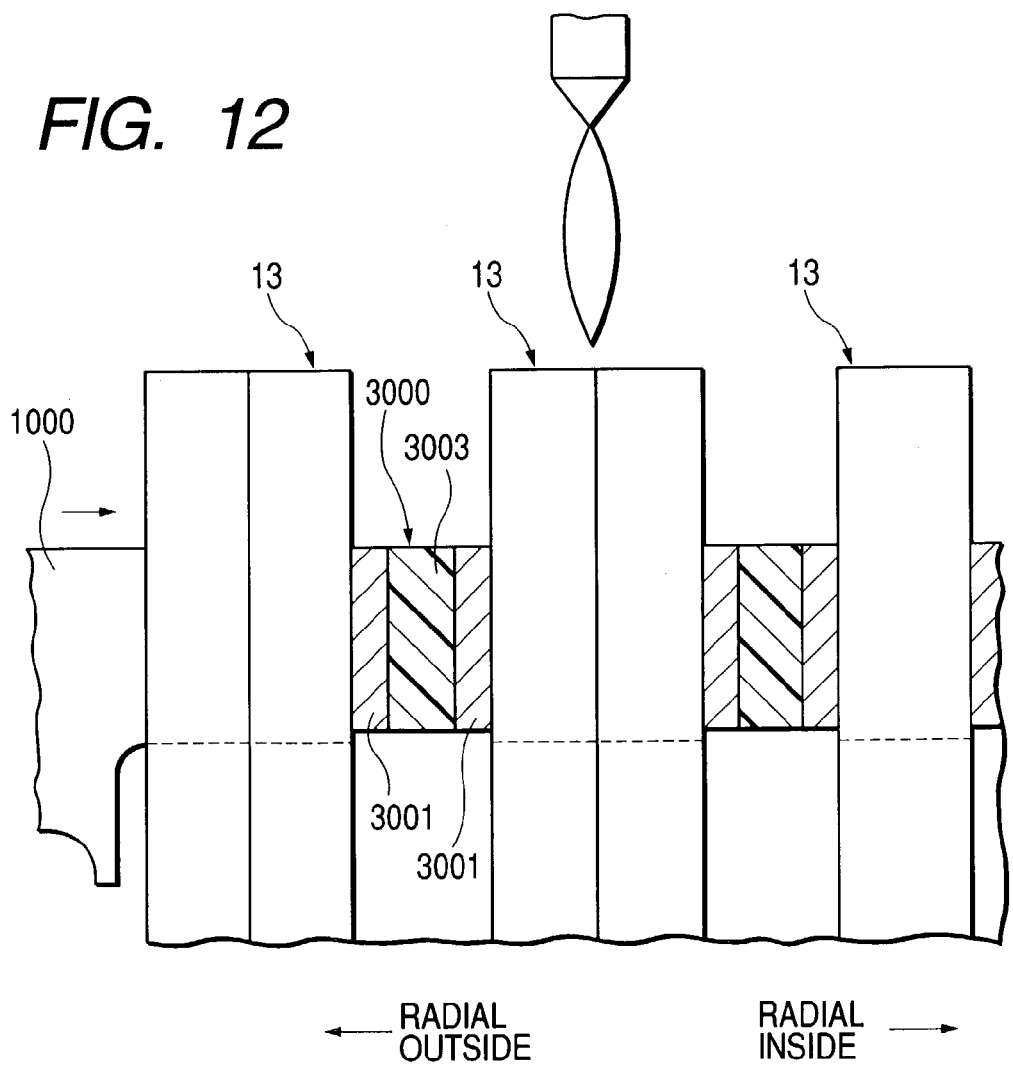
FIG. 12 is an illustration of a welding process in a proper mode.

A third modification mode is shown in FIG. 12.

In this modification mode, the interposition member 3000 is composed of a circular-arc-like metallic member 3001 brought into contact with a side surface of the radial-outside end tip portion pair 13, a circular-arc-like metallic member 3002 brought into contact with a side surface of the radial-inside end tip portion pair 13, and an insulating-resin-made circular-arc-like interposition member 3003 interposed between both the circular-arc-like metallic members 3001 and 3002.

Both the circular-arc-like metallic members 3001 and 3002 carry out the feeding to the end tip portion pair 13 or absorb heat from the end tip portion pair 13. After the completion of the welding, the circular-arc-like metallic members 3001 and 3002 are cut by a thin disc-like rotary cutter in a spacing between the end tip portion pairs adjacent to each other in a circumferential direction. This eliminates the removal of the interposition member 300.

Preferably, the welding is achieved by means of TIG welding and, in this case, the torch electrode 2 is made of tungsten and is set as a negative electrode.

(Fourth Modification Mode)

Figure 13:
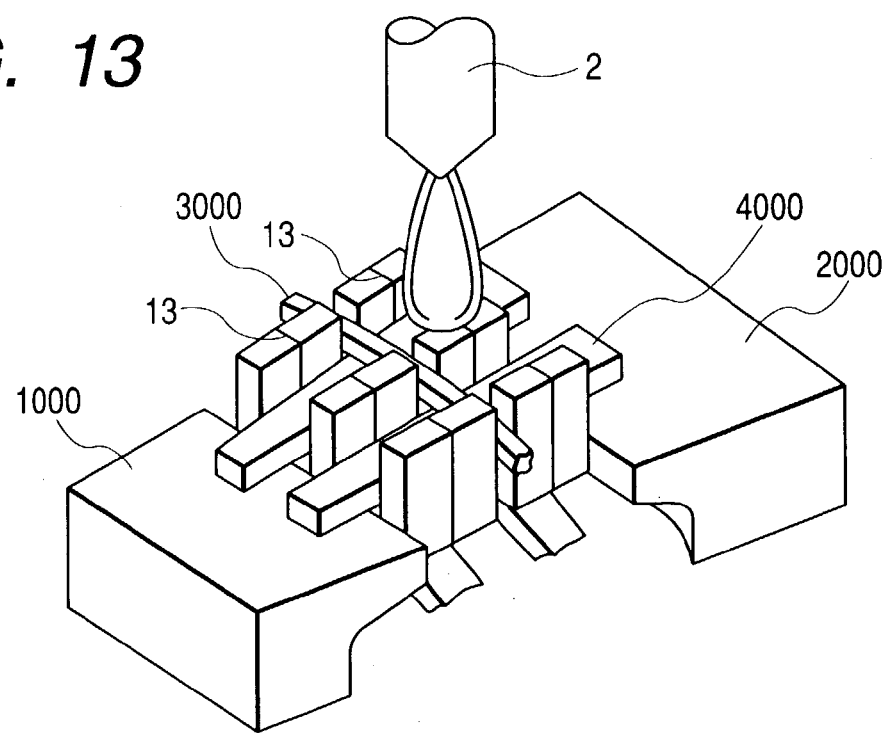
FIG. 13 is an illustration of a welding process in a proper mode.

A third modification mode is shown in FIG. 13.

Figure 10:
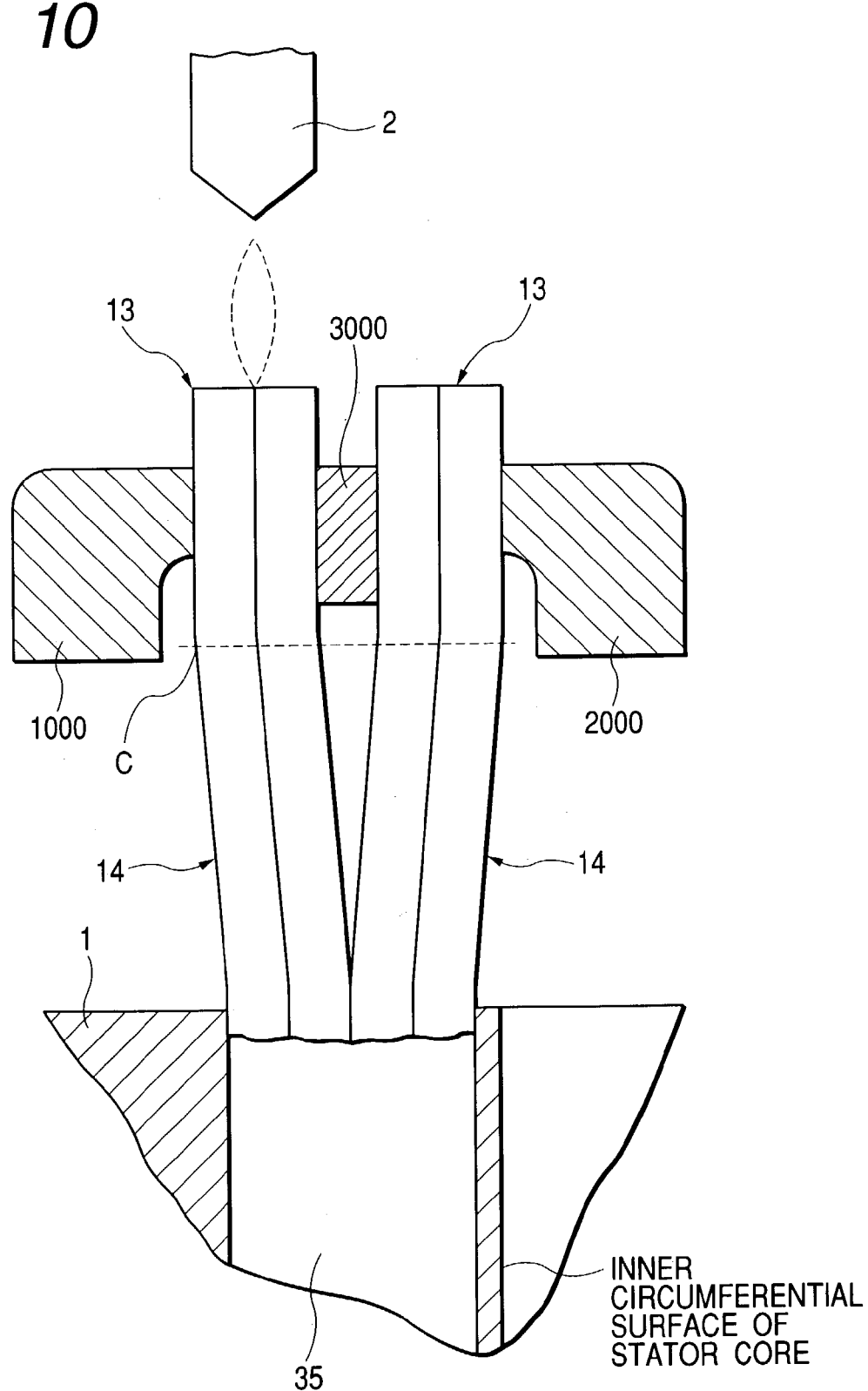
FIG. 10 is an illustration of a welding process in a proper mode.

In this modification mode, in the welding process shown in FIG. 10, a circular-arc-like auxiliary electrode 300 is placed on bar-like electrodes 4000 at approximately right angles. This enables four proximal sides of the end tip portion pair 13 to be brought into contact with the basal electrode blocks 1000,2000, the circular-arc-like auxiliary electrode 3000 and the bar-like electrodes 4000, which can further reduce the contact resistance of the proximal portion of the end tip portion pair 13 with respect to the electrodes and can reduce the heat transmission to the insulating coat.

It should be understood that the present invention is not limited to the above-described embodiments, and that it is intended to cover all changes and modifications of the embodiments of the invention herein which do not constitute departures from the spirit and scope of the invention.

What is claimed is:

1. A method of manufacturing a sequential segment joining type stator coil for use in an electric rotating machine, comprising the steps of:
    preparing a large number of segments each having a generally U-shaped or generally V-shaped head portion, in-slot conductor portions extending from both ends of said head portion and individually accommodated in a pair of slots of a stator core and protruding end portions extending from both said in-slot conductor portions to protrude from an end surface of said stator core;
    placing end tip portions forming tip portions of said protruding end portions and protruding in axial directions by pairs in an radially adjoining condition to produce a plurality of end tip portion pairs;
    sandwiching and pressing proximal portions of said plurality of end tip portion pairs between a pair of basal electrodes in radial directions in a state where a circular-arc-like interposition member is put between said plurality of radially adjoining end tip portion pairs; and
    applying a voltage between a tip electrode facing tip surfaces of said end tip portion pair and said pair of basal electrodes or said interposition member to electrically weld said end tip portion pair together.

2. The method according to claim 1, wherein said interposition member is made from a metallic material having an electrical conductive property to also function as a portion of said basal electrodes, with said metallic material being removed after the completion of the welding.

3. The method according to claim 2, wherein said interposition member is put between the large number of end tip portion pairs adjacent to each other in radial directions.

4. The method according to claim 2, wherein said interposition member is made of an insulating material having an electrical insulating property.

5. The method according to claim 1, wherein said interposition member is composed of a pair of metallic members having an electrical conductive property and individually brought into contact with said end tip portion pair existing at both sides thereof in a radial direction and an insulating member interposed between both said metallic members.

* * * * *